US008639880B2

(12) United States Patent
Augenstein et al.

(10) Patent No.: US 8,639,880 B2
(45) Date of Patent: *Jan. 28, 2014

(54) HIERARCHICAL STORAGE MANAGEMENT FOR DATABASE SYSTEMS

(75) Inventors: Oliver Augenstein, Boeblingen (DE); Stefan Bender, Woerrstadt (DE); Karl Fleckenstein, Malsch (DE); Andreas Uhl, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,592

(22) Filed: Jul. 31, 2012

(65) Prior Publication Data

US 2012/0297138 A1 Nov. 22, 2012

Related U.S. Application Data

(63) Continuation of application No. 12/797,942, filed on Jun. 10, 2010, now Pat. No. 8,316,182.

(30) Foreign Application Priority Data

Aug. 11, 2009 (EP) .................................... 09167612

(51) Int. Cl.
G06F 12/00 (2006.01)
(52) U.S. Cl.
USPC ........................................................ 711/117
(58) Field of Classification Search
None
See application file for complete search history.

(56) References Cited

U.S. PATENT DOCUMENTS

| 5,276,860 | A  | * | 1/1994  | Fortier et al. ................... 714/6.3 |
| 5,276,867 | A  | * | 1/1994  | Kenley et al. ....................... 1/1 |
| 5,394,526 | A  | * | 2/1995  | Crouse et al. ................. 709/219 |
| 6,512,652 | B1 | * | 1/2003  | Nelson et al. ............. 360/78.01 |
| 7,640,406 | B1 | * | 12/2009 | Hagerstrom et al. ......... 711/159 |
| 8,316,182 | B2 | * | 11/2012 | Augenstein et al. .......... 711/117 |
| 8,380,929 | B2 | * | 2/2013  | Augenstein et al. .......... 711/117 |
| 2008/0208929 | A1 | * | 8/2008 | Phillipi ........................ 707/204 |
| 2009/0089462 | A1 | * | 4/2009 | Strutt .............................. 710/16 |
| 2010/0122050 | A1 | * | 5/2010 | Hutchison et al. ............ 711/162 |

* cited by examiner

Primary Examiner — Hiep Nguyen
(74) Attorney, Agent, or Firm — Griffiths & Seaton PLLC

(57) ABSTRACT

Embodiments for managing data in a hierarchical storage server storing data blocks of a database system comprising primary storage devices being in an active mode and secondary storage devices being in one of an active and passive mode are provided. In response to read and write requests for data blocks at logical storage locations, a block mapping device determines physical storage locations on the storage devices. Read requests switch over secondary storage devices to the active mode when they are in the passive mode. Write requests write data blocks only to the primary storage devices. Secondary storage devices that have not been accessed for a minimum activation time may be switched over from the active to the passive mode to save power consumption and cooling. Data migration and data recall policies control moving of data blocks between the primary and secondary storage devices and are primarily based on threshold values.

38 Claims, 9 Drawing Sheets

| Device Type | Source/ Target | Parameter | Trigger | Activity |
|---|---|---|---|---|
| Secondary | Source | Data recall source Low-water mark | Fall below | Perform data recall |
| Primary | Target | Data migration source High-water mark | Fall below | Perform data recall |
| Primary | Source | Data migration source High-water mark | Exceed | Start data migration |
| Primary | Source | Data migration source Low-water mark | Fall below | Stop data migration |
| Secondary | Target | Data migration target Low-water mark | Fall below | Start data migration |
| Seocndary | Target | Data migration target High-water mark | Exceed | Stop data migration |

Fig. 9a

| Device Type | Parameter | Trigger | Activity |
|---|---|---|---|
| Secondary | Minimum activation time | Fall below | Perform data recall |
| Secondary | Minimum activation time | Exceed | Swtich over to passive mode |
| Seocndary | Maximum number of active disks | Exceed | Swtich over to passive mode |

Fig. 9b

HIERARCHICAL STORAGE MANAGEMENT FOR DATABASE SYSTEMS

CLAIM TO FOREIGN PRIORITY

The present application is a Continuation of U.S. patent application Ser. No. 12/797,942 filed on Jun. 10, 2010, which claims priority to European Patent Application No. 09167612.2, filed Aug. 11, 2009 and entitled "Hierarchical Storage Management for Database Systems", the contents of both U.S. patent application Ser. No. 12/797,942 and European Patent Application No. 09167612.2 are incorporated herein by reference.

BACKGROUND OF THE INVENTION

1. Field of the Invention

The present invention relates in general to computers, and more particularly to apparatus, method and computer program product embodiments managing data in a hierarchical storage server storing data blocks on primary and secondary storage devices, the primary storage devices being in an active mode and the secondary storage devices being in an active or passive mode.

2. Description of the Related Art

Hierarchical Storage Management HSM is a data storage technique which automatically moves data between a primary and a secondary storage tier. HSM is sometimes also referred to as tiered storage. In HSM systems, data files that are frequently used are stored on high-speed storage devices of the primary storage tier, such as hard disk drive arrays. They are more expensive per byte stored than slower devices of the secondary storage tier, such as optical discs and magnetic tape drives. The bulk of application data is stored on the slower low-cost secondary storage devices and copied to the faster high-cost disk drives when needed. In effect, HSM turns the fast disk drives into caches for the slower mass storage devices. The HSM system migrates data files from the primary disk drives to the secondary tape drives if they have not been used for a certain period of time, typically a few months. This data migration frees expensive disk space on the primary storage devices. If an application does reuse a file which is on a secondary storage device, it is automatically recalled, that is, moved back to the primary disk storage. Due to this transparent file recall capability, the file remains accessible from a client application although it has been physically migrated to the secondary storage. HSM is implemented, for example, in the Tivoli® Storage Manager. For details, see http://www-.ibm.com/software/tivoli/products/storage-mgr/.

HSM is advantageous for file systems that contain a large quantity of inactive files that are used only sporadically. In a typical HSM system, 90 percent of the file data can be stored off-site on secondary storage devices. Only a small quantity of spare storage space is needed on the primary storage devices to recall a small portion of the file data from the secondary storage devices when the client application requests access to this small portion.

For this reason, HSM is, however, not well suited for databases. Database systems store table and index data in large datasets or files that are accessed randomly. Even if the tables and indices are assigned to different datasets or files, the database system can infrequently access all data at periodic points in time, for example, at the end of a month or year. Since the prior art HSM systems only provide a small quantity of free space on the primary devices to store recalled data, this free space would not be sufficient to store a large quantity of the recalled data temporarily.

SUMMARY OF THE DESCRIBED EMBODIMENTS

Storage controllers often support a suite of replication services that allow copy of a volume to be created. The types of copies supported may vary by product, but may include such features as a point in time copy or a continuous copy of either a synchronous or asynchronous copy. The copy function is generally invoked by establishing a relationship between two or more volumes. The topology relationships between the two or more volumes may be linear e.g., A→B→C→D . . . or may be branched e.g., A→B & C.

In view of the foregoing, a need exists for a data management method using a hierarchical storage server system that saves costs of purchase and operation and provides faster access to larger quantities of stored data that are requested infrequently. Accordingly, various embodiments for managing data in a hierarchical storage server storing data blocks on primary and secondary storage devices are provided. In one such embodiment, by way of example only, the primary storage devices are in an active mode and the secondary storage devices are in one of an active and passive mode. A read request is received that has been sent from a client application to read a data block from a logical storage location of the hierarchical storage server. A physical storage location and one of the primary and secondary storage devices are determined when the determined physical storage location is associated with the requested logical storage location according to stored logical-to-physical mappings and the determined physical storage location resides on the determined primary or secondary storage device. When the determined physical storage location resides on the determined primary storage device, the data block is read from the determined physical storage location. When the determined physical storage location resides on the determined secondary storage device being in the active mode, the data block is read from the determined physical storage location. When the determined physical storage location resides on the determined secondary storage device being in the passive mode, the determined secondary storage device is switched over from the passive mode to the active mode and the data block is read from the determined physical storage location on the determined secondary storage device having been switched over from the passive mode to the active mode. The read data block is returned to the client application.

According to a pre-defined data recall policy, sets of source physical storage locations may be determined when the source physical storage locations have been read-accessed within a pre-defined minimum activation time and each of the sets resides on a respective secondary storage device in the active mode. The data recall policy may comprise rules and configurable parameters thresholds to control a data recall. References to the source physical storage locations may be recorded. According to the data recall policy, one or more of the determined sets of source physical storage locations may be determined as sources for a data recall when quantities of the recorded sets of source physical storage locations fall below respective data recall source low-water marks for the respective secondary storage devices. The thresholds of the data recall policy may comprise the minimum activation time and the data recall low-water marks. Target physical storage locations residing on one or more primary storage devices may be determined. The data recall may be performed by copying data blocks from the determined sets of source physical storage locations to the determined target physical storage locations.

Each of the logical-to-physical mappings may associate one respective physical storage location with one respective logical storage location. The associated logical and physical storage locations may be marked as used or unused. The client application may be only able to read from and write to logical storage locations that are marked as used.

A write request may be received that has been sent from the client application to write a data block to a first logical storage location of the hierarchical storage server. A used first physical storage location and one of the primary and secondary storage devices may be determined when the determined first physical storage location is associated with the first logical storage location according to the stored logical-to-physical mappings and when the determined first physical storage location resides on the determined primary or secondary storage device. When the determined first physical storage location resides on the determined primary storage device, the data block may be written to the determined first physical storage location on the determined primary storage device. When the determined first physical storage location resides on the determined secondary storage device, an unused second physical storage location and a further one of the primary storage devices may be determined, where the determined second physical storage location resides on the determined further primary storage device. The further primary storage device can be different from the primary storage device of the preceding case. The second physical storage location may be associated with a second logical storage location according to the stored logical-to-physical mappings. The determined second physical storage location may be marked as used. The data block may be written to the determined second physical storage location. The logical-to-physical mappings may be modified by associating the first logical storage location with the second physical storage location and the second logical storage location with the first physical storage location. The determined first physical storage locations may be marked as unused. The modification of the logical-to-physical mappings does not require switching over the secondary storage device from the passive mode to the active mode.

Quantities of used and unused physical logical storage locations of the primary and secondary storage devices may be collected.

Last read access timestamps of the respective secondary storage devices may be recorded. A set of secondary storage devices in the active mode may be determined. A first subset and a second subset of the determined set of secondary storage devices may be determined when the determined set of secondary storage devices exceeds a pre-defined maximum number, the first subset of secondary storage devices has at most the pre-defined maximum number, and the secondary storage devices of the second subset have received no read requests from the client application within a pre-defined minimum activation time and have lower percentages of unused physical storage locations than the secondary storage devices of the first subset. The secondary storage devices of the determined second subset may be switched over from the active mode to the passive mode.

According to a pre-defined data migration policy, source primary storage devices may be determined as sources for a data migration and target secondary storage devices may be determined as targets for the data migration. The data migration policy may comprise rules and configurable parameters thresholds to control the data migration. According to the data migration policy, pairs of respective used source physical storage locations and respective unused target physical storage locations may be determined. The determined source physical storage locations reside on the determined source primary storage devices and are associated with respective source logical storage locations. The target physical storage locations reside on the determined target secondary storage devices and are associated with respective target logical storage locations. The determined target physical storage locations may be marked as used. The data migration may be performed by copying for each of the determined pairs a respective data block from the respective source physical storage location to the respective target physical storage location. The logical-to-physical mappings may be modified by associating for each of the determined pairs the respective target logical storage location with the respective source physical storage location and the respective source logical storage location with the respective target physical storage location. The determined source physical storage locations may be marked as unused.

Source physical storage locations may be determined in response to a data migration request sent from the client application.

The data migration policy may comprise the following steps: Last access timestamps of used source physical storage locations on the primary storage devices may be recorded. First quantities of used source physical storage locations on the respective source primary storage devices may be determined. As sources for the data migration, source primary storage devices may be determined when the respective first quantities exceed respective data migration source high-water marks. Second quantities of used target physical storage locations on the respective target secondary storage devices may be determined. As targets for the data migration, target secondary storage devices may be determined when the respective second quantities fall below respective data migration target low-water marks. The determined target secondary storage devices may be switched over from the passive mode to the active mode when the determined target secondary storage devices are in the passive mode and before a data migration to the determined target secondary storage devices is started. An ascending order of last access timestamps of the used source physical storage locations may be determined. The data migration of data blocks may be started from subsets of used source physical storage locations residing on the respective determined source primary storage devices to unused target physical storage locations residing on the determined target secondary storage devices being in the active mode. The data migration may be performed in the determined order. The data migration may be stopped for the determined source primary storage devices when the respective first quantities fall below respective data migration source low-water marks and for the determined target secondary storage devices when the respective second quantities exceed respective data migration target high-water marks.

First quantities of used physical storage locations on the respective primary storage devices may be determined. According to the data recall policy, target primary storage devices may be determined as targets for the data recall when the respective first quantities of the target primary storage devices fall below respective data recall target low-water marks. According to the data recall policy, pairs of respective used source physical storage locations and respective unused target physical storage locations may be determined. The determined source physical storage locations reside on the determined source secondary storage devices and are associated with respective source logical storage locations. The determined target physical storage locations reside on the determined target primary storage devices and are associated with respective target logical storage locations. The determined target physical storage locations may be marked as used. The data recall may be performed by copying for each of the determined pairs a respective data block from the respective source physical storage location to the respective target physical storage location. The logical-to-physical mappings may be modified by associating for each of the determined pairs the respective target logical storage location with the respective source physical storage location and the respective source logical storage location with the respective target physical storage location. The determined source physical storage locations may be marked as unused.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIGS. 9a-b illustrate tables of control parameters according to an embodiment of the present invention.

DETAILED DESCRIPTION OF THE DRAWINGS

Figure 1:
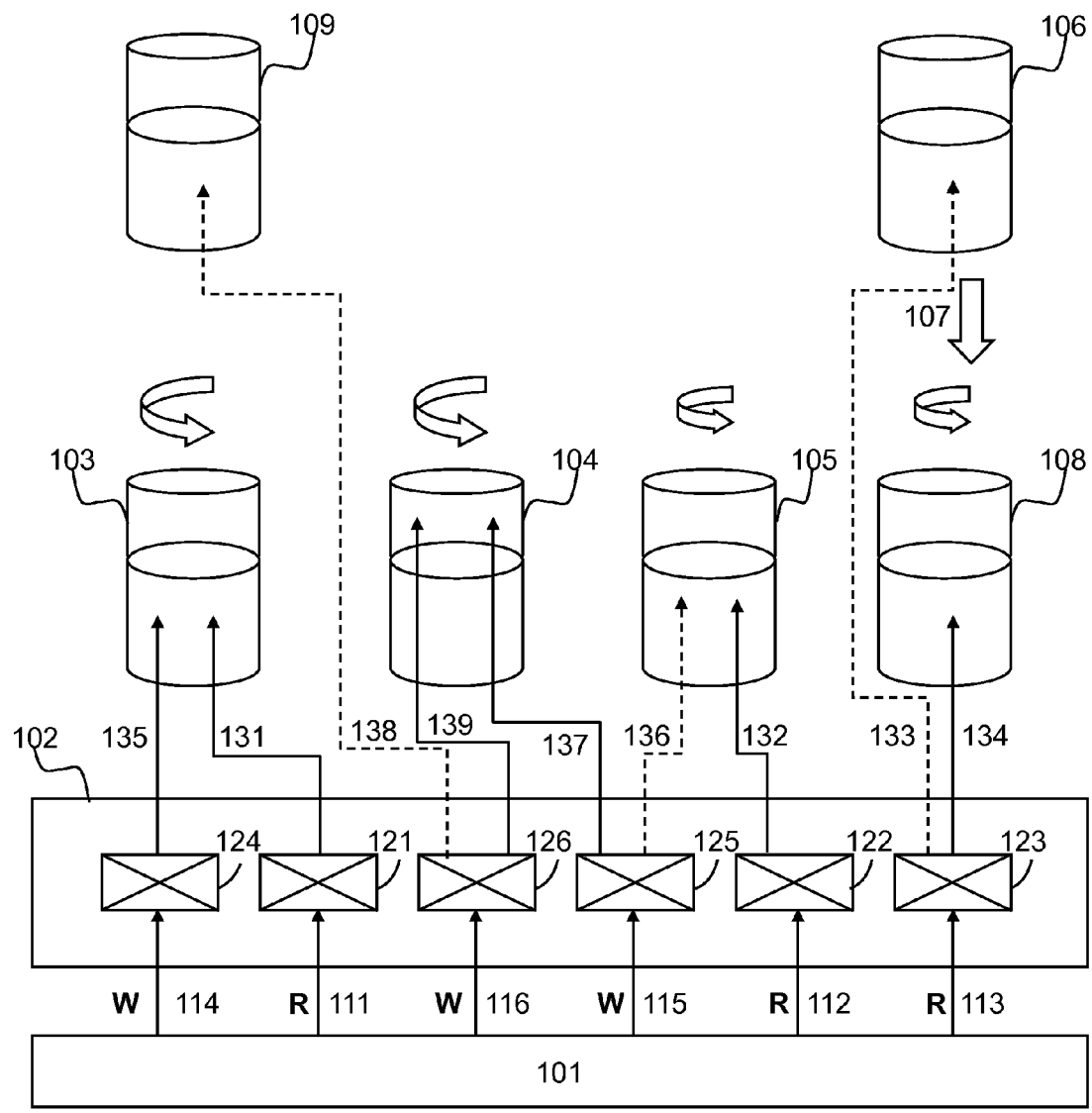
FIG. 1 illustrates a block diagram of a hierarchical storage server processing read and write requests according to an embodiment of the present invention.

Instead of migrating data that are infrequently used to slower tape devices, an embodiment of the present invention moves the data to a massive array of idle disks MAID. A MAID system can comprise hundreds to thousands of hard drives for data storage. The MAID disks have multiple operation levels to save power and heat dissipation, for example, at Level 0, the hard disk is performing read/write operations, at Level 1, the hard disk is parking its read/write head, at Level 2, the hard disk is parking its read/write head and reducing its rotational speed, and at Level 3, the hard disk is stopped.

MAID can supplement or replace tape libraries in hierarchical storage management. This means that the hard disks are powered-off Level 3 when the migrated data is infrequently used. When the data are needed, for example, while performing a month-end or year-end closing, these hard disks are powered-on Level 0, and the data are accessible to the application after a small delay time.

One embodiment of the present invention solves the problem of insufficient disk capacity on the primary storage devices when a large quantity of data must be read infrequently, because the data do not have to be copied from the secondary storage devices to the primary storage devices. Compared to prior art database systems, this embodiment allows to power-off a majority of hard disks because the data are only needed occasionally and provides an efficient way to save power consumption for disk operation and cooling.

Tivoli® Storage Manager TSM or ITSM is a Hierarchical Storage Management solution that provides a centralized, policy-based data backup and recovery software. After a data migration of a file, an HSM client of TSM still stores a file stub on the primary storage device, while the original file is kept on the secondary backup storage device. The file stub has a much smaller size than the original file.

One aspect of one embodiment, however, is a database system that requires transparent access to even large data quantities at a time. This embodiment does not maintain file stubs on the primary storage devices. Instead, a block mapping device is responsible for the access management to the stored data blocks.

The datasets or files of a database system are structured in pages or blocks, which are sequences of bytes having a nominal length, a logical block size. The logical block size in database systems is equal to or is a multiple of the physical block size of the operating system. Typical logical block or page sizes are 4 KB, 8 KB, 16 KB, and 32 KB. The data block structure facilitates handling of data because a whole block is normally read or written at a time. Therefore, this exemplary embodiment is based on handling data blocks as smallest data entity of the database system.

High-performance primary storage devices can be, for example, Fiber Channel Storage Area Network SAN devices or Small Computer System Interface SCSI storage devices. Low-cost secondary storage devices can be, for example, Serial AT Attachment SATA storage devices, which are designed for being powered on and off more frequently than the primary storage devices. The differences between the primary and secondary storage devices are not only price and performance, but also capacity and function.

The file system or database system layer, which are considered as client applications, does not directly access the primary and secondary storage devices. A block mapping device virtualizes the access to the primary and secondary storage devices by presenting them as one virtual HSM block storage device. The size of the block storage device is lower or equal to the total size of the primary and secondary storage devices. Whenever the client application requests access to a data block, the block mapping device will determine and access a physical storage location on one of the physical storage devices. In response to a read request, the block mapping device reads a data block from the determined physical storage location and returns the read data block to the client application. In response to a write request, the block mapping device writes a data block to the determined physical storage location.

FIG. 1 shows a block diagram of the hierarchical storage server, which is processing read and write requests. In one embodiment, a client application 101 is typically a database management system. The client application sends read requests 111, 112, 113 and write requests 114, 115, 116 for respective data blocks at respective logical storage locations 121-126 to the hierarchical storage server. A block mapping device 102 maps the logical storage locations to respective physical storage locations. Each of the physical storage locations resides on one of the primary and secondary storage devices of the hierarchical storage server. FIG. 1 depicts two primary storage devices 103, 104 that are always in the active mode, one secondary storage device 105 that is in the active mode, and two secondary storage devices 106, 109 that are in the passive mode. The secondary storage device 106 in the passive mode is switched over 107 to the active mode 108. The large curved right arrows on top of the cylinders 103, 104 symbolize the primary storage devices. The small curved right arrows on top of the cylinders 105, 108 symbolize the secondary storage devices being in the active mode.

The primary storage devices usually provide faster access than the secondary storage devices in the active mode and are therefore represented with a larger curved arrow symbol. When the curved arrow symbol is missing 106, 109, the depicted storage device is a secondary storage device in the passive mode. The block mapping device comprises a mapping component, a controller, a migration component, a recall component, and a block mapping table. The block mapping table typically resides on a dedicated storage device, such as a fast primary storage device. Alternatively, the block mapping table can be stored in super-blocks on one or more primary storage devices that share storage space with regular data blocks. The block mapping table stores logical-to-physical mappings between logical storage locations and physical storage locations. In one embodiment, each of the physical storage locations has an associated logical storage location and vice versa. Each pair of a physical storage location and a logical storage location is marked as used or unused.

In one embodiment, the client application is only able to access logical storage locations that are marked as used. The access operations are only read and write requests. The squares that are marked with crosses 121-126 representing used logical storage locations. In a sample scenario, the client application 101 sends a first read request 111 to the block mapping device 102 to read a data block from a first logical storage location 121. The mapping component maps 131 the logical storage location 121 on a corresponding physical storage location on one 103 of the primary storage devices and the controller reads the requested data block from the mapped physical storage location and returns the requested data block to the client application. The client application sends a second read request 112 referring a second logical storage location 122 to the block mapping device.

The block mapping device maps 132 the second logical storage location on a physical storage location on one 105 of the secondary storage devices being in the active mode. In the active mode, the secondary storage device can directly respond to the read request. When the client application sends a third read request 113 referring a third logical storage location 123 to the block mapping device, the third logical storage location is mapped 133 on a physical storage location on one 106 of the secondary storage devices being in the passive mode. The secondary storage device in the passive mode cannot immediately respond to the read request. The controller must switch over 107 the secondary storage device from the passive mode 106 to the active mode 108 before the requested data block can be read 134 from the mapped physical storage location.

A first write request 114 to write a data block to a forth logical storage location 124 is mapped 135 on a physical storage location on one 103 of the primary storage devices and the data block of the write request is stored at the mapped physical storage location. A second write request 115 refers to a fifth logical storage location 125 that is mapped 136 on a physical storage location on one 105 of the secondary storage devices being in the active mode. The data block is not written to the secondary storage device. The mapping component, however, determines 137 an unused further physical storage location on a further one 104 of the primary storage devices and the controller writes the data block to the determined further physical storage location.

The block mapping table is updated by now mapping the fifth logical storage location on the determined further physical storage location instead of the previously mapped physical storage location. The further physical storage location is marked as used and the previously mapped physical storage location, which was associated with the second write request, is marked as unused. A third write request 116 is associated with a sixth logical storage location 126 that is mapped 138 on a physical storage location on one 109 of the secondary storage devices in the passive mode. The behavior is equivalent to the secondary storage device being in the active mode. The data block is actually stored 139 at an unused further physical storage location on a further one 104 of the primary storage devices.

Block storage devices typically provide storage space as logical volumes with pre-configured sizes. To enlarge storage space, new logical volumes may be created or existing logical volumes may be extended. When a logical volume is configured by a volume manager, the block mapping device selects unused physical storage locations on primary and secondary storage devices and marks the selected physical storage locations as used. For one logical volume, the allocation sizes of the physical storage locations on the respective primary and secondary storage devices can be pre-determined, for example, 30% of the physical storage locations on one or more primary storage devices, and 70% of the physical storage locations on one or more secondary storage devices.

In one embodiment, the block mapping device selects unused physical storage locations on secondary storage devices being in the passive mode rather than being in the active mode. It is unlikely that write requests will refer to physical storage locations on the secondary storage devices right after the corresponding logical volume has been created or extended.

The physical storage locations of one logical volume are as far as possible contiguous on each of the physical storage devices. The block mapping device allows for each of the physical storage devices a respective maximum number of used physical storage locations to preserve a respective minimum number of unused physical storage locations. Theses maximum and minimum numbers conform to data migration high-water marks, which are pre-defined for the data migration.

When the client application requests to write new data blocks to chunks of physical storage locations, the block mapping device advantageously selects as far as possible used physical storage locations on primary storage devices, and otherwise used physical storage locations on secondary storage devices to avoid changes of the logical-to-physical mappings.

Figure 2:
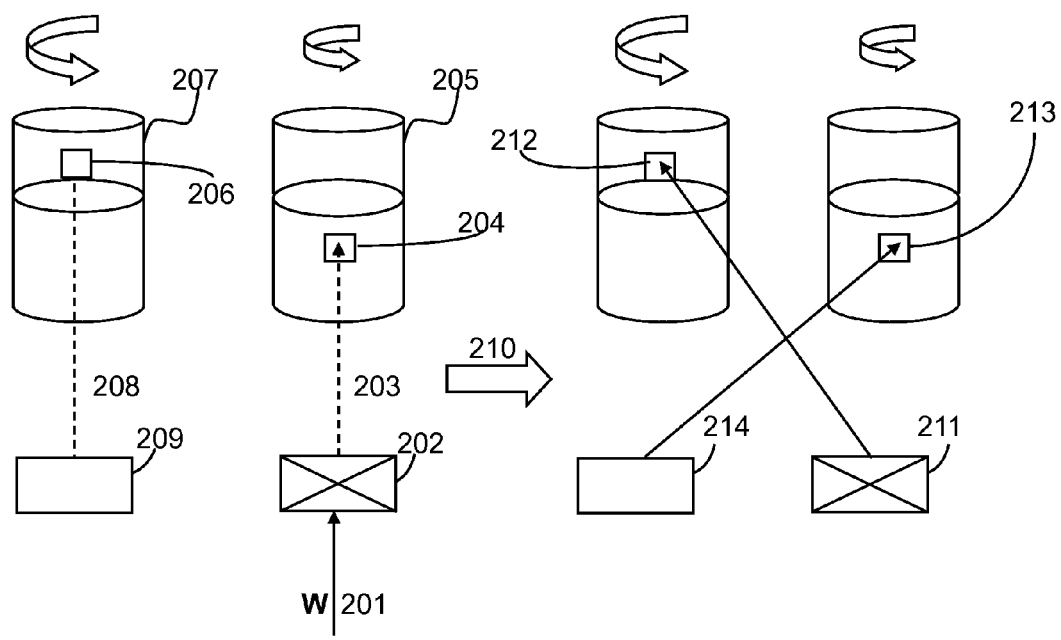
FIG. 2 illustrates a block diagram of the hierarchical storage server modifying logical-to-physical mappings in response to a write request according to an embodiment of the present invention.

FIG. 2 illustrates block diagrams of the hierarchical storage server modifying logical-to-physical mappings in response to a write request 201 to write a data block to a first logical storage location 202. The mapping component finds a logical-to-physical mapping of 203 the first logical storage location 202 on a first physical storage location 204 on one 205 of the secondary storage devices. The first physical storage location has been marked as used. The secondary storage device can be in an active or passive mode. FIG. 2 only shows the active mode case. The mapping mechanism works the same way in the passive mode case. The mapping component determines an unused second physical storage location 206 on one 207 of the primary storage devices. The determined unused second physical storage location has been mapped 208 on a corresponding second logical storage location 209. The mapping component marks the second physical storage location as used and writes the data block to the second physical storage location. Then, the mapping component swaps 210 the logical-to-physical mapping. This means: It associates the first logical storage location 211 with the second physical storage location 212, and it further associates the first physical storage location 213 with the second logical storage location 214. The first physical storage location is marked as unused and the controller commits the I/O operation. A write access to data blocks on the secondary storage devices effectively releases storage capacity by marking the corresponding physical storage locations as unused. This released storage space can be used as a target of a data migration.

Figure 3:
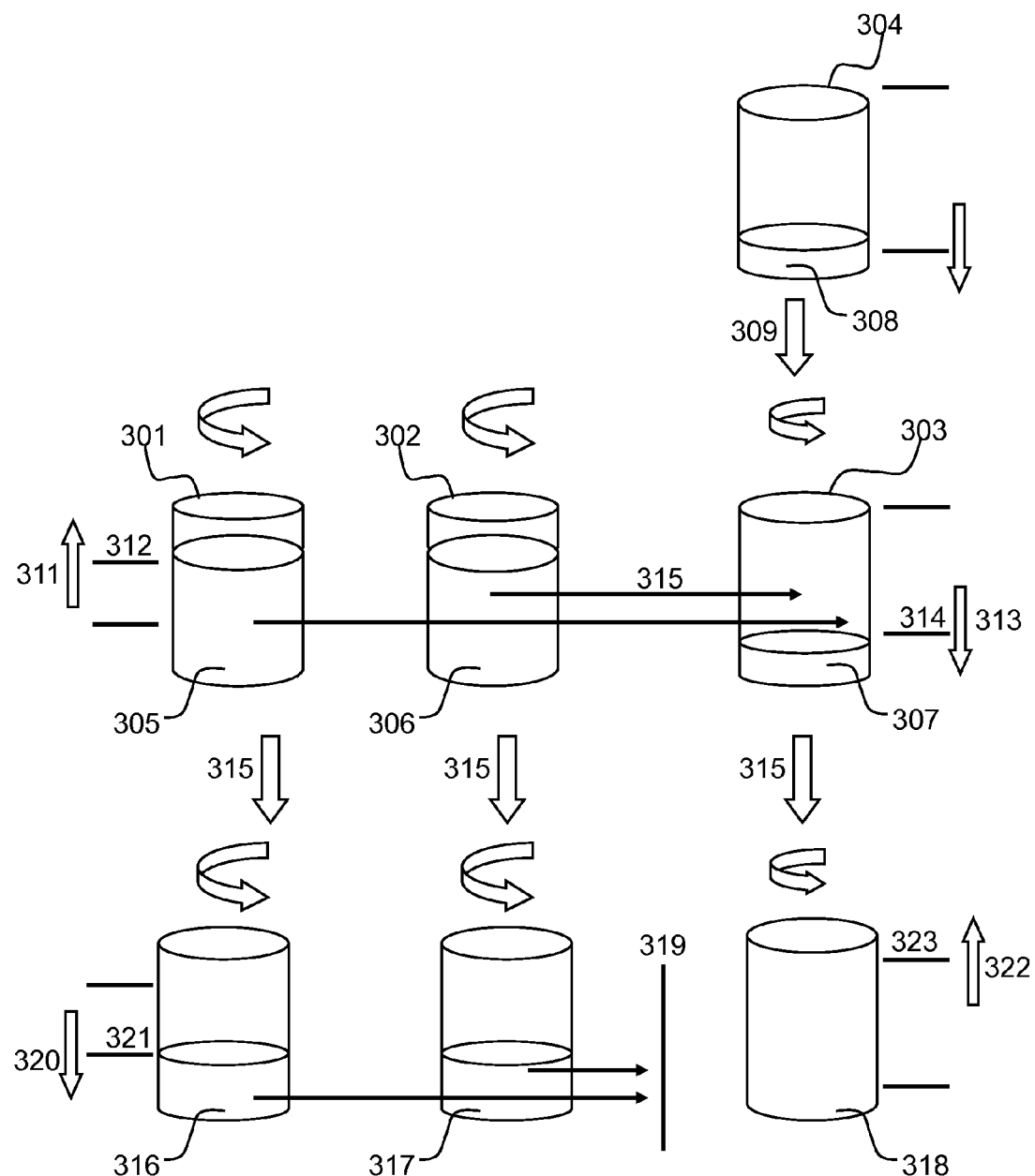
FIG. 3 illustrates a block diagram of the hierarchical storage server performing a data migration according to an embodiment of the present invention.

FIG. 3 illustrates a block diagram of the hierarchical storage server, which is performing a data migration. A data migration moves data blocks from primary storage devices to secondary storage devices. The rules and threshold values the data migration steps are based on are called data migration policy. A data migration may be performed when the data blocks on the primary storage devices have not been accessed for a pre-defined period of time and when used physical storage space on the primary storage devices exceeds upper limits. Thus, the freed storage space on the primary storage devices can be advantageously used to store frequently used data blocks.

The block diagram shows two primary storage devices 301, 302 and one secondary storage device 303 that have respectively been selected as sources and as target of a data migration. In general, one or more primary storage devices and one or more secondary storage devices can be involved in the data migration. The data migration requires that the block mapping device is recording last access timestamps of used physical storage locations of the primary storage devices. The recorded access events can be read and write operations. These last access timestamps are typically stored together with entries of the block mapping table. To control the data migration, a migration component of the block mapping device determines for each of the primary storage devices a respective first quantity 305, 306 of used physical storage locations. The migration component further determines for each of the secondary storage devices a respective second quantity 307, 308 of used physical storage locations. This determination is independent of the active or passive modes of the secondary storage devices. In the block diagram, the first and second quantities of used physical storage locations are represented by respective vertical extensions of shaded cylinders.

The migration component selects a primary storage device as a source for data migration when the respective first quantity 305 of the primary storage device exceeds 311 a data migration source high-water mark 312. Each of the primary and secondary storage devices can have individual low-water mark and high-water mark thresholds. A secondary storage device is selected as a target for the data migration when the respective second quantity 307 of the secondary storage device falls below 313 a data migration target low-water mark 314. Instead of exceeding a high-water mark threshold or falling below a low-water mark threshold, it can be sufficient that the observed quantities reach the respective threshold values. The block diagram represents exceeding 311 a threshold by a small up block arrow, and falling below 313 a threshold by a small down block arrow. The thresholds 312, 314, 321, 323 are represented by horizontal bars.

When a secondary storage device has been selected as a target for the data migration and is in the passive mode 304, the controller must switch over 309 the selected secondary storage device from the passive mode to the active mode before starting 315 the data migration. The migration component sorts used physical storage locations according to the respective last access timestamps and copies the physical storage locations in an ascending order of the last access timestamps. This means: the longer data blocks have not been accessed on the primary storage devices, the earlier the data blocks will be migrated to the secondary storage devices. During the data migration, the first quantities 316, 317 of used physical storage locations are decreasing on the source storage devices and the second quantities 318 of used physical storage locations are increasing on the target storage devices. The data migration stops 319 when at least one of the following conditions is fulfilled: the first quantity falls below 320 a data migration source low-water mark 321 and the second quantity exceeds 322 a data migration target high-water mark 323. The target high-water mark is typically 100 percent on the secondary storage devices so that all target storage locations are used. When the high-water mark is exactly 100 percent, the second quantity can only reach, but not exceed the 100 percent value.

Alternatively, the data migration can be started for a set of user-defined data blocks or for data blocks that have not been accessed for a specific period of time. The user-defined data blocks can belong to one or more files specified by the user.

Figure 4:
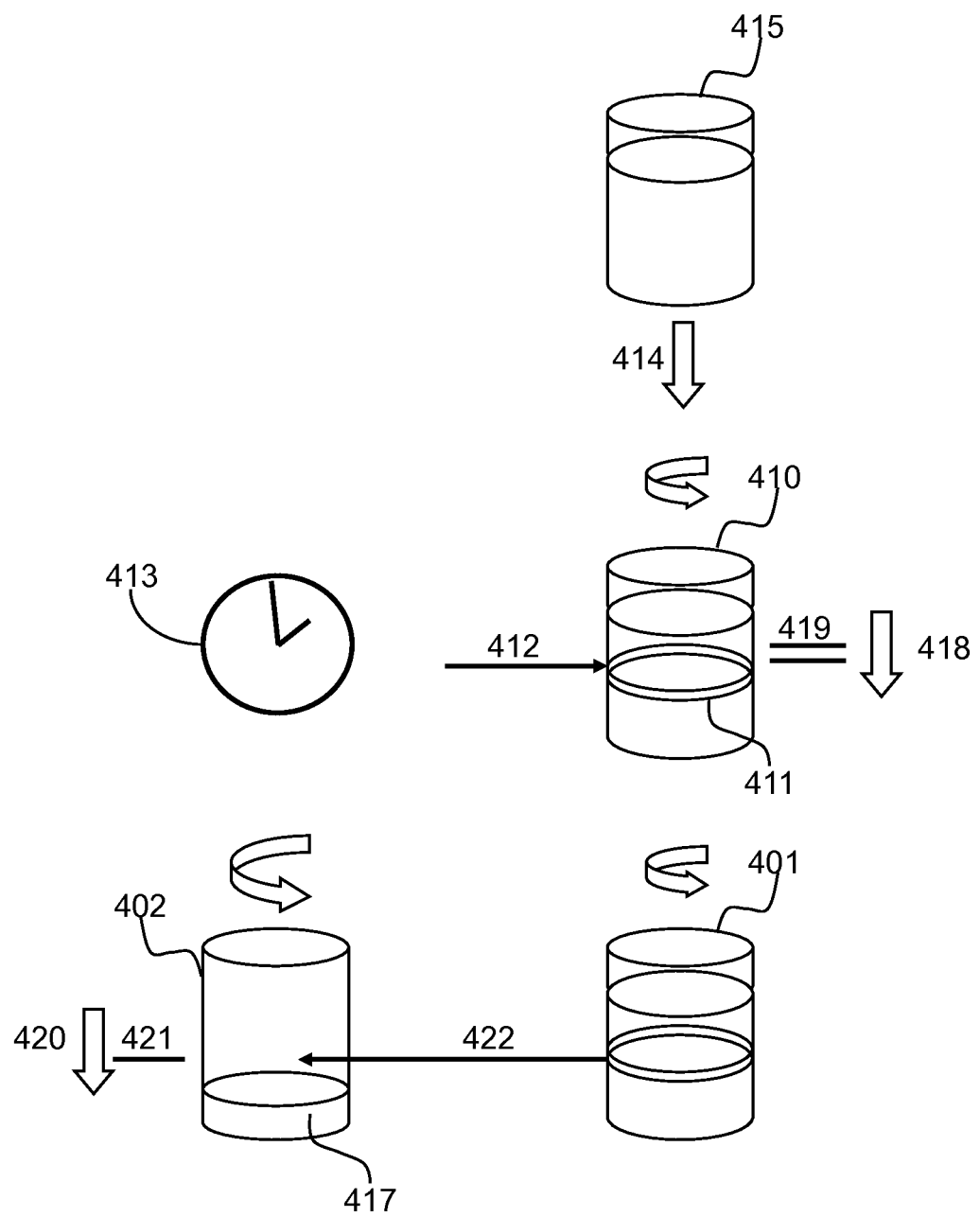
FIG. 4 illustrates a block diagram of the hierarchical storage server performing a data recall according to an embodiment of the present invention.

FIG. 4 illustrates a block diagram of the hierarchical storage server, which is performing a data recall. For the data recall, secondary storage devices in the active mode are selected when at most a pre-defined number of data blocks on the secondary storage devices have been accessed within a pre-defined period of time. The access is only a read-access to the secondary storage devices. In the remainder of the description, this pre-defined time is called minimum activation time. The minimum activation time can be separately configured for each of the secondary storage devices. The data recall moves the accessed data blocks from the selected secondary storage devices to primary storage devices. When the secondary storage devices are accessed, they must be in the active mode. The data recall intends to remove frequently accessed "hot spots" from secondary storage devices. The data recall increases the probability that the secondary storage devices can be switched over from the active mode to the passive mode after they have not been accessed for the minimum activation time. This active-to-passive switchover is explained in FIG. 6.

When more than the pre-defined number of data blocks has been accessed within the minimum activation time, the data recall is avoided. A large data access can occur, for example, at month-end or year-end closing or while performing data mining operations. The data recall prevents that secondary hard disk drives are frequently powered-on and powered-off when only a few data blocks on the secondary hard disk drives are needed. Furthermore, the data recall requires sufficient free space on the target primary storage devices. The block diagram shows one secondary storage device 401 and one primary storage device 402 that have respectively been selected as a source and a target of a data recall. In general, one or more secondary storage devices and one or more primary storage devices can be involved in the data recall. The data recall requires that a recall component of the block mapping device records references to used physical storage locations of the secondary storage devices that have been accessed within the minimum activation time. Thus, the recall component can periodically determine for each 410 of the secondary storage devices a respective third quantity 411 of used physical storage locations that have been accessed 412 within the minimum activation time 413 after the secondary storage device has been switched over 414 from the passive mode 415 to the active mode 410.

The block diagram represents the third quantity 411 by the height of a cylinder section. The block mapping device can periodically delete the recorded references to physical storage locations from storage after a minimum activation time period elapsed. The recall component further determines for each of the primary storage devices the respective first quantity 417 of used physical storage locations. The recall component selects a secondary storage device 401, 410 in the active mode as a source for a data recall 422 when the respective third quantity 411 of the secondary storage device falls below 418 a data recall source low-water mark 419. The block diagram represents the threshold by the distance of two horizontal bars 419. A primary storage device 402 is selected as a target for the data recall when the respective first quantity 417 of the primary storage device falls below 420 a data recall target low-water mark 421. As in the case of the data migration, each of the primary and secondary storage devices can have individual low-water mark and high-water mark thresholds. Since the number of data blocks selected for a data recall is typically smaller than the number of data blocks moved in a data migration, the data recall can be completed within a shorter period of time than the data migration. The rules and threshold values used in the data recall steps are called data recall policy.

Figure 5:
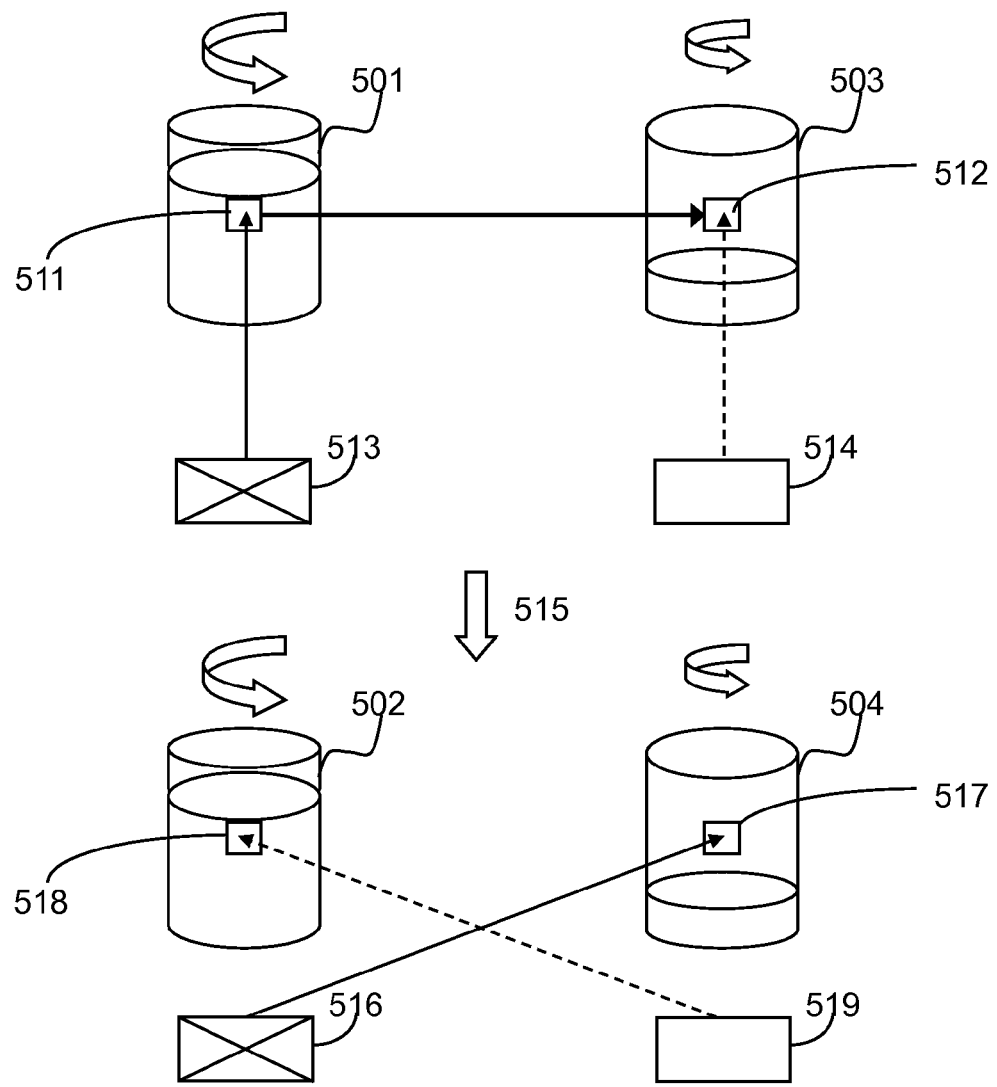
FIG. 5 illustrates a block diagram of the hierarchical storage server modifying logical-to-physical mappings while performing a data migration according to an embodiment of the present invention.

FIG. 5 illustrates a block diagram of the hierarchical storage server, where the mapping component modifies logical-to-physical mappings while performing a data migration. To perform the data migration, the mapping component firstly determines pairs of respective source and target physical storage locations. Consider one pair of a source and target physical location. Before data migration, the source physical storage location 511 on one of the primary storage devices is marked as used. The target physical storage location 512 on one of the secondary storage devices is marked as unused. The source physical storage location 511 is associated with a corresponding source logical storage location 513. And the target physical storage location 512 is associated with a corresponding target logical storage location 514. Second, the mapping component marks the target physical storage location as used. Third, the controller copies the data block from the source physical storage location to the target physical storage location. Fourth, the mapping component associates the source logical storage location 516 with the target physical storage location 517 and further associates the source physical storage location 518 with the target logical storage location 519. Finally, the source physical storage location will be marked as unused.

In the case of the data recall, the modification of the logical-to-physical mappings is performed in a corresponding way, where the source physical storage location resides on the secondary storage device and the target physical storage location resides on the primary storage device.

Figure 6:
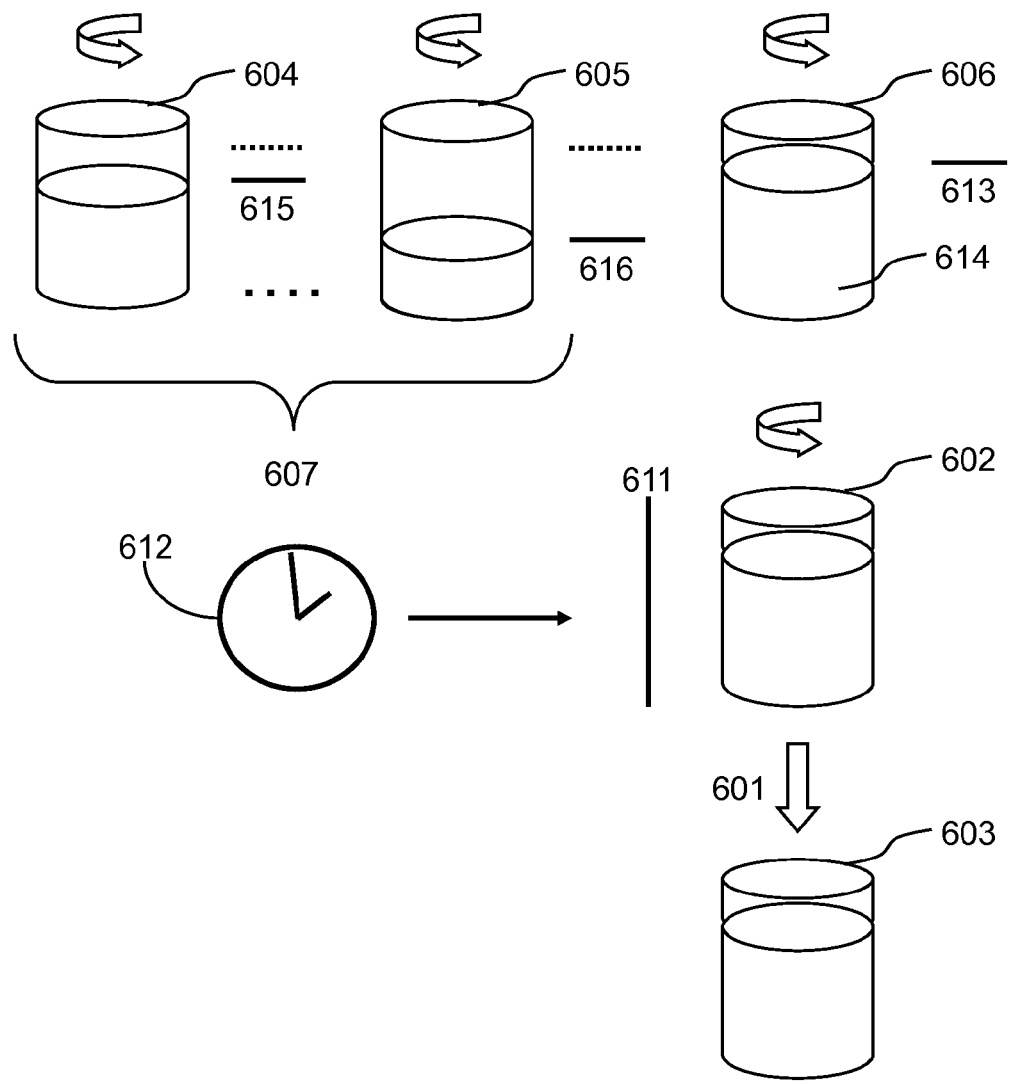
FIG. 6 illustrates a block diagram of the hierarchical storage server switching over secondary storage devices from the active mode to the passive mode according to an embodiment of the present invention.

FIG. 6 illustrates a block diagram of the hierarchical storage server, where the controller switches over secondary storage devices from the active mode to the passive mode. In FIG. 1 and in FIG. 3, two reasons have been described why secondary storage devices are switched over 107, 309 from the passive mode to the active mode. The first reason is a read access 133 to a physical storage location on the secondary storage device in the passive mode 106. The second reason is a data migration 315 of a secondary storage device that is in the passive mode 304. To save power and cooling for the secondary storage devices, a condition must be defined to switch over 601 secondary storage devices from the active mode 602 to the passive mode 603. The first part of the condition is that the number of secondary storage devices 604, 605, 606 in the active mode exceeds a pre-defined maximum number 607. The surplus secondary storage devices 606 are determined by a second and third part of the condition. The second part states that the surplus secondary storage devices 602 have not been read-accessed 611 within a minimum activation time 612. And the third part requires that the surplus secondary storage devices 606 have a higher percentage 613 of used physical storage locations 614 than other secondary storage devices 615, 616 in the active mode that have neither been accessed within the minimum activation time. The delay of the switch-over from the active mode to the passive mode for at least the minimum activation time avoids activation-passivation contention. This means that secondary storage devices are frequently powered-off and powered-on.

Figure 7:
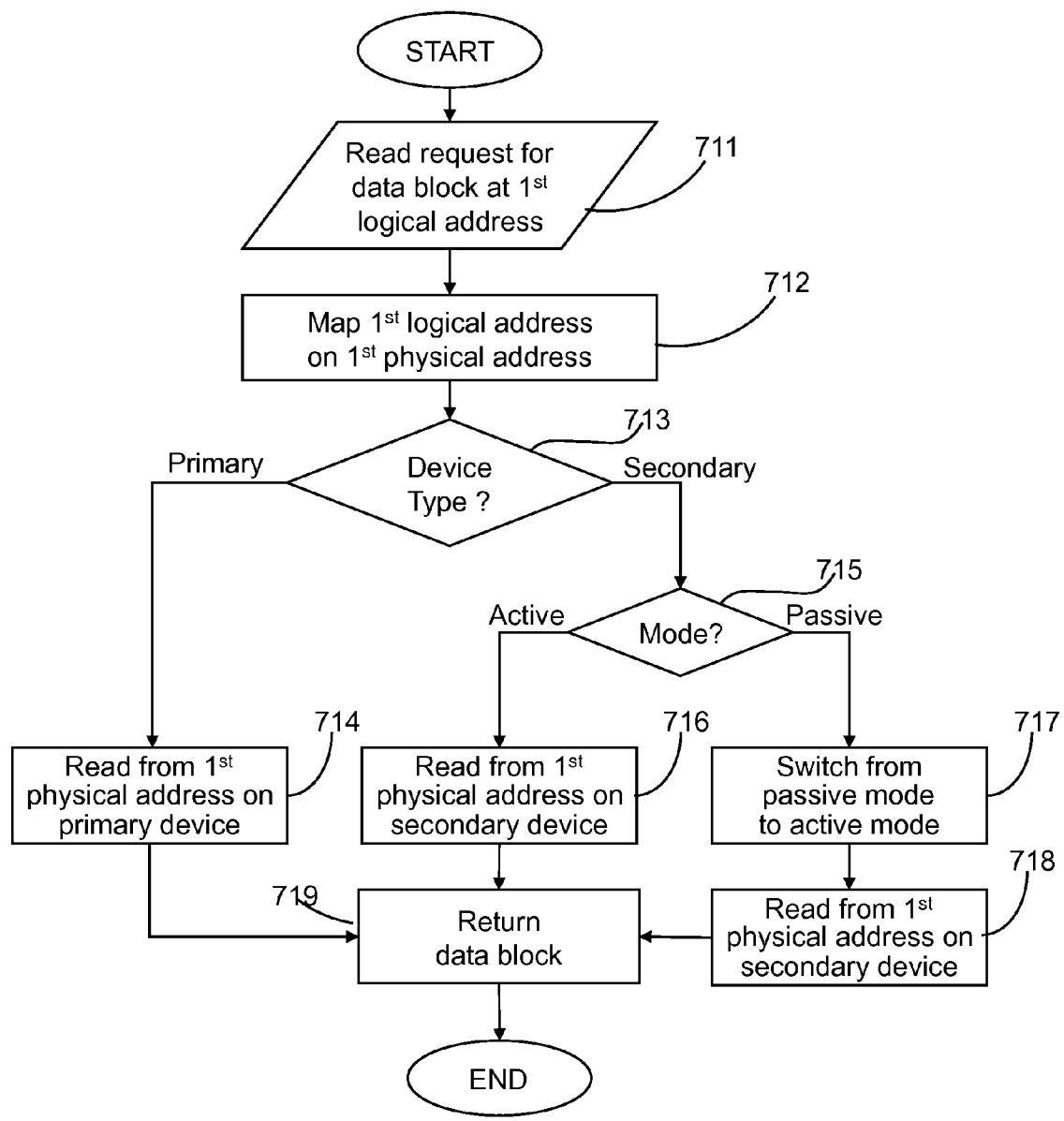
FIG. 7 illustrates a flow chart processing a read request by the hierarchical storage server according to an embodiment of the present invention.

FIG. 7 illustrates a flow chart describing the method of one embodiment how the hierarchical storage server is processing a read request. The block mapping device receives 711 a read request from a client application to read a data block from a first logical address. The mapping component of the block mapping device maps 712 the first logical address on a first physical address and checks 713 the type of the storage device the physical address is associated with. In the case of a primary storage device 713, "primary", the controller reads 714 the requested data block from the primary storage device at the first physical address. In the case of a secondary storage device 713, "secondary", the method checks 715 a mode of the secondary storage device. When the secondary storage device is 715, "active" in the active mode, the controller reads 716 the requested data block from the secondary storage device at the first physical address. When the secondary storage device is 715, "passive" in the passive mode, the controller switches over 717 the secondary storage device from the passive mode to the active mode, and reads 718 the requested data block from the secondary storage device at the first physical address. The block mapping device returns 719 the read data block to the client application.

Figure 8:
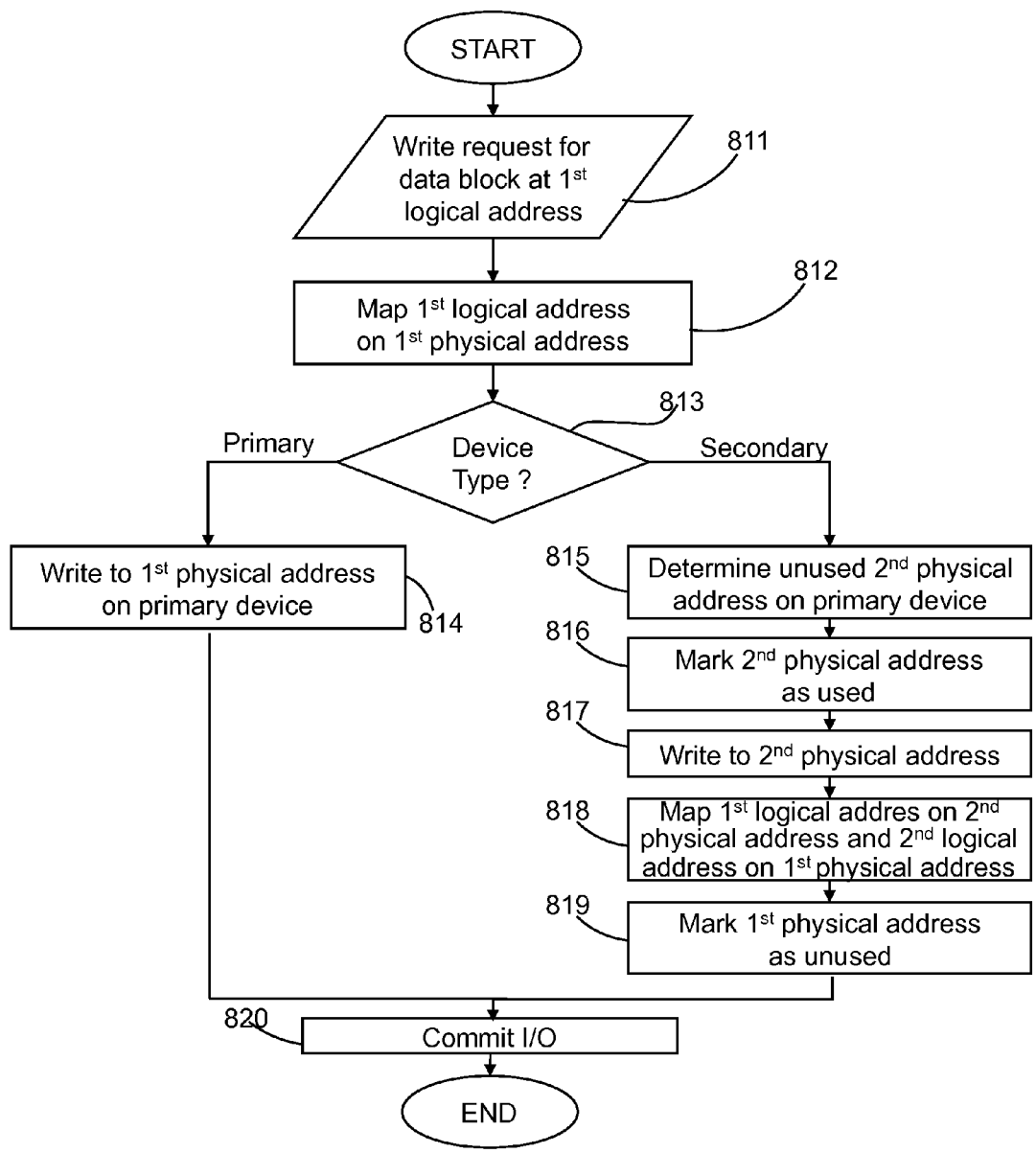
FIG. 8 illustrates a flow chart processing a write request by the hierarchical storage server according to an embodiment of the present invention.

FIG. 8 illustrates a flow chart describing the method of one embodiment how the hierarchical storage server is processing a write request. The block mapping device receives 811 a write request from a client application to write a data block at a first logical address. The mapping component of the block mapping device maps 812 the first logical address on a first physical address and checks 813 the type of the storage device the physical address is associated with. In the case of a primary storage device 813, "primary", the controller writes 814 the requested data block to the primary storage device at the first physical address. In the case of a secondary storage device 813, "secondary," the mapping component determines 815 an unused second physical address on a primary storage device. The mapping component marks 816 the second physical address as used. According to the mapping table, the second physical address is associated with a second logical address. The controller writes 817 the data block of the write request to the determined primary storage device at the determined second physical address. The mapping component maps 818 the first logical address on the determined second physical address and the first physical address on the second logical address. The mapping component marks 819 the first physical address as unused. Finally, the block mapping device commits 820 the write operation.

FIGS. 9a-9b illustrate tables of control parameters that are pre-defined for the hierarchical storage system. The parameters can be configured individually for each of the storage devices, for a group of storage devices, or for the complete storage system. The table of FIG. 9a describes the configuration parameters for the primary and secondary storage devices, where the control parameters define threshold values for the used physical storage locations. The table of FIG. 9b contains further control parameters that are only used for the secondary storage devices. These control parameters are typically stored on dedicated storage devices or in super-blocks on one or more primary storage devices.

According to a first alternative embodiment of the present invention, the secondary storage devices are not limited to hard disks, but may use other storage technologies or hybrids of different storage technologies, for example, rewritable optical disk drives, low-cost hard disk drives, and low-cost memory devices. A data migration can take place to a specific type or a combination of these secondary storage devices. The data migration must be able to overwrite data on the secondary storage devices. For example, an optical disk can be rewritable. As described in the preceding sections, write requests do not modify data blocks on the secondary storage devices, but only on the primary storage devices.

According to a second alternative embodiment of the present invention, the hierarchical storage server may provide a change-over feature for peak load situations when the block mapping device receives many write and read requests in a short time. According to the change-over feature, secondary storage devices may be selected to be at least partly used as primary storage devices. This means when the selected secondary storage devices are in the passive mode, they are switched over to the active mode. The selected secondary storage devices retain the active mode. Data blocks can be directly written to the selected secondary storage devices. For the selected secondary storage devices, data recall operations can be suspended. When the peak load situation has ended, the selected secondary storage devices can be used again as described by one embodiment.

According to a third alternative embodiment of the present invention, physical storage locations on primary storage devices do not have to be marked as used to write a data block. After the write operation, the physical storage locations will be marked as used.

As will be appreciated by one skilled in the art, aspects of the present invention may be embodied as a system, method or computer program product. Accordingly, aspects of the present invention may take the form of an entirely hardware embodiment, an entirely software embodiment including firmware, resident software, micro-code, etc. or an embodiment combining software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a non-exhaustive list of the computer readable storage medium would include the following: an electrical connection having one or more wires, a portable computer diskette, a hard disk, a random access memory RAM, a read-only memory ROM, an erasable programmable read-only memory EPROM or Flash memory, an optical fiber, a portable compact disc read-only memory CD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network LAN or a wide area network WAN, or the connection may be made to an external computer for example, through the Internet using an Internet Service Provider.

Aspects of the present invention are described above with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for managing data in a hierarchical storage server storing data blocks on primary and secondary storage devices, the primary storage devices being in an active mode and the secondary storage devices being in one of an active and passive mode, the method comprising:
   receiving a read request sent from a client application to read a data block from a logical storage location of the hierarchical storage server;
   determining a physical storage location and one of the primary and secondary storage devices when the determined physical storage location is associated with the requested logical storage location according to stored logical-to-physical mappings and the determined physical storage location resides on the determined primary or secondary storage device;
   reading the data block from the determined physical storage location when the determined physical storage location resides on the determined primary storage device; and
   returning the read data block to the client application.

2. The method of claim 1, further including:
   reading the data block from the determined physical storage location when the determined physical storage location resides on the determined secondary storage device being in the active mode, and
   switching over the determined secondary storage device from the passive mode to the active mode when the determined physical storage location resides on the determined secondary storage device being in the passive mode, and reading the data block from the determined physical storage location on the determined secondary storage device having been switched over from the passive mode to the active mode.

3. The method of claim 1, further including:
   determining according to a pre-defined data recall policy sets of source physical storage locations when the source physical storage locations have been read-accessed within a pre-defined minimum activation time and each of the sets resides on a respective secondary storage device being in the active mode,
   determining one or more of the recorded sets of source physical storage locations as sources for a data recall when quantities of the recorded sets of source physical storage locations fall below respective data recall source low-water marks for the respective secondary storage devices,
   determining target physical storage locations residing on one or more primary storage devices, and
   performing the data recall by copying data blocks from the determined sets of source physical storage location to the determined target physical storage locations.

4. The method of claim 1, wherein each of the logical-to-physical mappings associates one respective physical storage location with one respective logical storage location, the associated logical and physical storage locations are marked as used or unused, and the client application is only able to read from and write to logical storage locations that are marked as used.

5. The method of claim 4, further including:
   receiving a write request sent from the client application to write a data block to a first logical storage location of the hierarchical storage server,
   determining a used first physical storage location and one of the primary and the secondary storage devices when the determined first physical storage location is associated with the first logical storage location according to the stored logical-to-physical mappings and when the determined first physical storage location resides on the determined primary or secondary storage device,
   writing the data block to the determined first physical storage location when the determined first physical storage location resides on the determined primary storage device,
   determining an unused second physical storage location and a further one of the primary storage devices when the determined first physical storage location resides on the determined secondary storage device and the determined second physical storage location resides on the determined further primary storage device, the second physical storage location being associated with a second logical storage location according to the stored logical-to-physical mappings,
   marking the determined second physical storage location as used,
   writing the data block to the determined second physical storage location,
   modifying the logical-to-physical mappings by associating the first logical storage location with the second physical storage location and the second logical storage location with the first physical storage location, and
   marking the determined first physical storage location as unused;
   wherein modifying the logical-to-physical mappings does not require switching over the secondary storage device from the passive mode to the active mode.

6. The method of claim 4, further including:
   recording last read access timestamps of the respective secondary storage devices,
   determining a set of secondary storage devices in the active mode,
   determining a first and a second subset of the determined set of secondary storage devices when the determined set of secondary storage devices exceeds a pre-defined maximum number, the first subset of secondary storage devices having at most the pre-defined maximum number, and the secondary storage devices of the second subset having received no read requests from the client application within a pre-defined minimum activation time and having lower percentages of unused physical storage locations than the secondary storage devices of the first subset, and switching over the secondary storage devices of the determined second subset from the active mode to the passive mode.

7. The method of claim 4, further including:

determining according to a pre-defined data migration policy source primary storage devices as sources for a data migration and target secondary storage devices as targets for the data migration, determining pairs of respective used source physical storage locations and respective unused target physical storage locations according to the data migration policy, the determined source physical storage locations residing on the determined source primary storage devices and being associated with respective source logical storage locations, the target physical storage locations residing on the determined target secondary storage devices and being associated with respective target logical storage locations, marking the determined target physical storage locations as used, performing the data migration by copying for each of the determined pairs a respective data block from the respective source physical storage location to the respective target physical storage location, modifying the logical-to-physical mappings by associating for each of the determined pairs the respective target logical storage location with the respective source physical storage location and the respective source logical storage location with the respective target physical storage location, and marking the determined source physical storage locations as unused.

8. The method of claim 7, wherein the data migration policy includes the steps of:

recording last access timestamps of used physical storage locations on the primary storage devices, determining first quantities of used source physical storage locations on the respective source primary storage devices, determining as sources for the data migration source primary storage devices when the respective first quantities exceed respective data migration source high-water marks, determining second quantities of used target physical storage locations on the respective target secondary storage devices, determining as targets for the data migration target secondary storage devices when the respective second quantities fall below respective data migration target low-water marks, switching over the determined target secondary storage devices from the passive mode to the active mode when the determined target secondary storage devices are in the passive mode and before the data migration to the determined target secondary storage devices is started, determining an ascending order of last access timestamps of the used source physical storage locations, starting the data migration of data blocks from subsets of used source physical storage locations residing on the respective determined source primary storage devices to unused target physical storage locations residing on the determined target secondary storage devices being in the active mode, performing the data migration in the determined order, and stopping the data migration for the determined source primary storage devices when the respective first quantities fall below respective data migration source low-water marks and for the determined target secondary storage devices when the respective second quantities exceed respective data migration target high-water marks.

9. The method of claim 7, further including determining source physical source storage locations upon a data migration request sent from the client application.

10. The method of claim 3, further including:

determining first quantities of used physical storage locations on the respective primary storage devices, determining according to the data recall policy primary storage devices as targets for the data recall when the respective first quantities of the target primary storage devices fall below respective data recall target low-water marks, determining pairs of respective used source physical storage locations and respective unused target physical storage locations according to the data recall policy, the determined source physical storage locations residing on the determined source secondary storage devices and being associated with respective source logical storage location, the determined target physical storage locations residing on the determined target primary storage devices and being associated with respective target logical storage locations, marking the determined target physical storage locations as used, performing the data recall by copying for each of the determined pairs a respective data block from the respective source physical storage location to the respective target physical storage location, modifying the logical-to-physical mappings by associating for each of the determined pairs the respective target logical storage location with the respective source physical storage location and the respective source logical storage location with the respective target physical storage location, and marking the determined source physical storage locations as unused.

11. A system for managing data in a hierarchical storage server storing data blocks on primary and secondary storage devices, the primary storage devices being in an active mode and the secondary storage devices being in one of an active and passive mode, the system comprising:

a block mapping device, operable in the hierarchical storage server, wherein the block mapping device:

receives a read request sent from a client application to read a data block from a logical storage location of the hierarchical storage server, determines a physical storage location and one of the primary and secondary storage devices when the determined physical storage location is associated with the requested logical storage location according to stored logical-to-physical mappings and the determined physical storage location resides on the determined primary or secondary storage device, reads the data block from the determined physical storage location when the determined physical storage location resides on the determined primary storage device, and returns the read data block to the client application.

12. The system of claim 11, wherein the block mapping device:
   reads the data block from the determined physical storage location when the determined physical storage location resides on the determined secondary storage device being in the active mode, and
   switches over the determined secondary storage device from the passive mode to the active mode when the determined physical storage location resides on the determined secondary storage device being in the passive mode, and reading the data block from the determined physical storage location on the determined secondary storage device having been switched over from the passive mode to the active mode.

13. The system of claim 11, wherein the block mapping device:
   determines according to a pre-defined data recall policy sets of source physical storage locations when the source physical storage locations have been read-accessed within a pre-defined minimum activation time and each of the sets resides on a respective secondary storage device being in the active mode,
   determines one or more of the recorded sets of source physical storage locations as sources for a data recall when quantities of the recorded sets of source physical storage locations fall below respective data recall source low-water marks for the respective secondary storage devices,
   determines target physical storage locations residing on one or more primary storage devices, and
   performs the data recall by copying data blocks from the determined sets of source physical storage location to the determined target physical storage locations.

14. The system of claim 11, wherein each of the logical-to-physical mappings associates one respective physical storage location with one respective logical storage location, the associated logical and physical storage locations are marked as used or unused, and the client application is only able to read from and write to logical storage locations that are marked as used.

15. The system of claim 14, wherein the block mapping device:
   receives a write request sent from the client application to write a data block to a first logical storage location of the hierarchical storage server,
   determines a used first physical storage location and one of the primary and secondary storage devices when the determined first physical storage location is associated with the first logical storage location according to the stored logical-to-physical mappings and when the determined first physical storage location resides on the determined primary or secondary storage device,
   writes the data block to the determined first physical storage location when the determined first physical storage location resides on the determined primary storage device,
   determines an unused second physical storage location and a further one of the primary storage devices when the determined first physical storage location resides on the determined secondary storage device and the determined second physical storage location resides on the determined further primary storage device, the second physical storage location being associated with a second logical storage location according to the stored logical-to-physical mappings,
   marks the determined second physical storage location as used,
   writes the data block to the determined second physical storage location,
   modifies the logical-to-physical mappings by associating the first logical storage location with the second physical storage location and the second logical storage location with the first physical storage location, and
   marks the determined first physical storage location as unused;
   wherein modifying the logical-to-physical mappings does not require switching over the secondary storage device from the passive mode to the active mode.

16. The system of claim 14, wherein the block mapping device:
   records last read access timestamps of the respective secondary storage devices,
   determines a set of secondary storage devices in the active mode,
   determines a first and a second subset of the determined set of secondary storage devices when the determined set of secondary storage devices exceeds a pre-defined maximum number, the first subset of secondary storage devices having at most the pre-defined maximum number, and the secondary storage devices of the second subset having received no read requests from the client application within a pre-defined minimum activation time and having lower percentages of unused physical storage locations than the secondary storage devices of the first subset, and
   switches over the secondary storage devices of the determined second subset from the active mode to the passive mode.

17. The system of claim 14, wherein the block mapping device:
   determines according to a pre-defined data migration policy source primary storage devices as sources for a data migration and target secondary storage devices as targets for the data migration,
   determines pairs of respective used source physical storage locations and respective unused target physical storage locations according to the data migration policy, the determined source physical storage locations residing on the determined source primary storage devices and being associated with respective source logical storage locations, the target physical storage locations residing on the determined target secondary storage devices and being associated with respective target logical storage locations,
   marks the determined target physical storage locations as used,
   performs the data migration by copying for each of the determined pairs a respective data block from the respective source physical storage location to the respective target physical storage location,
   modifies the logical-to-physical mappings by associating for each of the determined pairs the respective target logical storage location with the respective source physical storage location and the respective source logical storage location with the respective target physical storage location, and
   marks the determined source physical storage locations as unused.

18. The system of claim 17, wherein the data migration policy comprises the steps of:
   recording last access timestamps of used physical storage locations on the primary storage devices, determining first quantities of used source physical storage locations on the respective source primary storage devices, determining as sources for the data migration source primary storage devices when the respective first quantities exceed respective data migration source high-water marks, determining second quantities of used target physical storage locations on the respective target secondary storage devices, determining as targets for the data migration target secondary storage devices when the respective second quantities fall below respective data migration target low-water marks, switching over the determined target secondary storage devices from the passive mode to the active mode when the determined target secondary storage devices are in the passive mode and before the data migration to the determined target secondary storage devices is started, determining an ascending order of last access timestamps of the used source physical storage locations, starting the data migration of data blocks from subsets of used source physical storage locations residing on the respective determined source primary storage devices to unused target physical storage locations residing on the determined target secondary storage devices being in the active mode, performing the data migration in the determined order, and stopping the data migration for the determined source primary storage devices when the respective first quantities fall below respective data migration source low-water marks and for the determined target secondary storage devices when the respective second quantities exceed respective data migration target high-water marks.

19. The system of claim 17, wherein the block mapping device determines source physical source storage locations upon a data migration request sent from the client application.

20. The system of claim 13, wherein the block mapping device:

determines first quantities of used physical storage locations on the respective primary storage devices, determines according to the data recall policy primary storage devices as targets for the data recall when the respective first quantities of the target primary storage devices fall below respective data recall target low-water marks, determines pairs of respective used source physical storage locations and respective unused target physical storage locations according to the data recall policy, the determined source physical storage locations residing on the determined source secondary storage devices and being associated with respective source logical storage location, the determined target physical storage locations residing on the determined target primary storage devices and being associated with respective target logical storage locations, marks the determined target physical storage locations as used, performs the data recall by copying for each of the determined pairs a respective data block from the respective source physical storage location to the respective target physical storage location, modifies the logical-to-physical mappings by associating for each of the determined pairs the respective target logical storage location with the respective source physical storage location and the respective source logical storage location with the respective target physical storage location, and marks the determined source physical storage locations as unused.

21. The system of claim 11, wherein the client application is a database application.

22. The system of claim 11, wherein the primary and secondary storage devices are hard disks and the secondary storage devices are massive arrays of idle disks MAID.

23. The system of claim 11, wherein the secondary storage devices are switched over from the passive mode to the active mode by powering on, and the secondary storage devices are switched over from the active mode to the passive mode by powering off.

24. The system of claim 11, wherein an access to the primary storage devices is faster than an access to the secondary storage devices.

25. A computer program product for managing data in a hierarchical storage server storing data blocks on primary and secondary storage devices, the primary storage devices being in an active mode and the secondary storage devices being in one of an active and passive mode, the computer program product comprising a computer-readable storage medium having computer-readable program code portions stored therein, the computer-readable program code portions comprising:

a first executable portion that receives a read request sent from a client application to read a data block from a logical storage location of the hierarchical storage server;

a second executable portion that determines a physical storage location and one of the primary and secondary storage devices when the determined physical storage location is associated with the requested logical storage location according to stored logical-to-physical mappings and the determined physical storage location resides on the determined primary or secondary storage device;

a third executable portion that reads the data block from the determined physical storage location when the determined physical storage location resides on the determined primary storage device; and a fourth executable portion that returns the read data block to the client application.

26. The computer program product of claim 25, further including a fifth executable portion that:

reads the data block from the determined physical storage location when the determined physical storage location resides on the determined secondary storage device being in the active mode, and switches over the determined secondary storage device from the passive mode to the active mode when the determined physical storage location resides on the determined secondary storage device being in the passive mode, and reading the data block from the determined physical storage location on the determined secondary storage device having been switched over from the passive mode to the active mode.

27. The computer program product of claim 25, further including a fifth executable portion that:

determines according to a pre-defined data recall policy sets of source physical storage locations when the source physical storage locations have been read-accessed within a pre-defined minimum activation time and each of the sets resides on a respective secondary storage device being in the active mode, determines one or more of the recorded sets of source physical storage locations as sources for a data recall when quantities of the recorded sets of source physical storage locations fall below respective data recall source low-water marks for the respective secondary storage devices, determines target physical storage locations residing on one or more primary storage devices, and performs the data recall by copying data blocks from the determined sets of source physical storage location to the determined target physical storage locations.

28. The computer program product of claim 25, wherein each of the logical-to-physical mappings associates one respective physical storage location with one respective logical storage location, the associated logical and physical storage locations are marked as used or unused, and the client application is only able to read from and write to logical storage locations that are marked as used.

29. The computer program product of claim 28, further including a fifth executable portion that:

receives a write request sent from the client application to write a data block to a first logical storage location of the hierarchical storage server, determines a used first physical storage location and one of the primary and secondary storage devices when the determined first physical storage location is associated with the first logical storage location according to the stored logical-to-physical mappings and when the determined first physical storage location resides on the determined primary or secondary storage device, writes the data block to the determined first physical storage location when the determined first physical storage location resides on the determined primary storage device, determines an unused second physical storage location and a further one of the primary storage devices when the determined first physical storage location resides on the determined secondary storage device and the determined second physical storage location resides on the determined further primary storage device, the second physical storage location being associated with a second logical storage location according to the stored logical-to-physical mappings, marks the determined second physical storage location as used, writes the data block to the determined second physical storage location, modifies the logical-to-physical mappings by associating the first logical storage location with the second physical storage location and the second logical storage location with the first physical storage location, and marks the determined first physical storage location as unused;

wherein modifying the logical-to-physical mappings does not require switching over the secondary storage device from the passive mode to the active mode.

30. The computer program product of claim 28, further including a fifth executable portion that:

records last read access timestamps of the respective secondary storage devices, determines a set of secondary storage devices in the active mode, determines a first and a second subset of the determined set of secondary storage devices when the determined set of secondary storage devices exceeds a pre-defined maximum number, the first subset of secondary storage devices having at most the pre-defined maximum number, and the secondary storage devices of the second subset having received no read requests from the client application within a pre-defined minimum activation time and having lower percentages of unused physical storage locations than the secondary storage devices of the first subset, and switches over the secondary storage devices of the determined second subset from the active mode to the passive mode.

31. The computer program product of claim 28, further including a fifth executable portion that:

determines according to a pre-defined data migration policy source primary storage devices as sources for a data migration and target secondary storage devices as targets for the data migration, determines pairs of respective used source physical storage locations and respective unused target physical storage locations according to the data migration policy, the determined source physical storage locations residing on the determined source primary storage devices and being associated with respective source logical storage locations, the target physical storage locations residing on the determined target secondary storage devices and being associated with respective target logical storage locations, marks the determined target physical storage locations as used, performs the data migration by copying for each of the determined pairs a respective data block from the respective source physical storage location to the respective target physical storage location, modifies the logical-to-physical mappings by associating for each of the determined pairs the respective target logical storage location with the respective source physical storage location and the respective source logical storage location with the respective target physical storage location, and marks the determined source physical storage locations as unused.

32. The computer program product of claim 31, wherein the data migration policy comprises the steps of:

recording last access timestamps of used physical storage locations on the primary storage devices, determining first quantities of used source physical storage locations on the respective source primary storage devices, determining as sources for the data migration source primary storage devices when the respective first quantities exceed respective data migration source high-water marks, determining second quantities of used target physical storage locations on the respective target secondary storage devices, determining as targets for the data migration target secondary storage devices when the respective second quantities fall below respective data migration target low-water marks, switching over the determined target secondary storage devices from the passive mode to the active mode when the determined target secondary storage devices are in the passive mode and before the data migration to the determined target secondary storage devices is started, determining an ascending order of last access timestamps of the used source physical storage locations, starting the data migration of data blocks from subsets of used source physical storage locations residing on the respective determined source primary storage devices to unused target physical storage locations residing on the determined target secondary storage devices being in the active mode, performing the data migration in the determined order, and stopping the data migration for the determined source primary storage devices when the respective first quantities fall below respective data migration source low-water marks and for the determined target secondary storage devices when the respective second quantities exceed respective data migration target high-water marks.

33. The computer program product of claim 31, further including a sixth executable portion that determines source physical source storage locations upon a data migration request sent from the client application.

34. The computer program product of claim 27, further including a sixth executable portion that:

determines first quantities of used physical storage locations on the respective primary storage devices, determines according to the data recall policy primary storage devices as targets for the data recall when the respective first quantities of the target primary storage devices fall below respective data recall target low-water marks, determines pairs of respective used source physical storage locations and respective unused target physical storage locations according to the data recall policy, the determined source physical storage locations residing on the determined source secondary storage devices and being associated with respective source logical storage location, the determined target physical storage locations residing on the determined target primary storage devices and being associated with respective target logical storage locations, marks the determined target physical storage locations as used, performs the data recall by copying for each of the determined pairs a respective data block from the respective source physical storage location to the respective target physical storage location, modifies the logical-to-physical mappings by associating for each of the determined pairs the respective target logical storage location with the respective source physical storage location and the respective source logical storage location with the respective target physical storage location, and marks the determined source physical storage locations as unused.

35. The computer program product of claim 25, wherein the client application is a database application.

36. The computer program product of claim 25, wherein the primary and secondary storage devices are hard disks and the secondary storage devices are massive arrays of idle disks MAID.

37. The computer program product of claim 25, wherein the secondary storage devices are switched over from the passive mode to the active mode by powering on, and the secondary storage devices are switched over from the active mode to the passive mode by powering off.

38. The computer program product of claim 25, wherein an access to the primary storage devices is faster than an access to the secondary storage devices.

\* \* \* \* \*